(12) United States Patent
Shirai et al.

(10) Patent No.: US 8,420,744 B2
(45) Date of Patent: Apr. 16, 2013

(54) PROCESS FOR THE PRODUCTION OF MODIFIED POLYSILOXANES

(75) Inventors: Akihiro Shirai, Ichihara (JP); Toshiaki Okado, Ichihara (JP); Takeshi Shimotori, Joetsu (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 13/389,169

(22) PCT Filed: Aug. 19, 2010

(86) PCT No.: PCT/JP2010/005123
§ 371 (c)(1),
(2), (4) Date: Feb. 6, 2012

(87) PCT Pub. No.: WO2011/021392
PCT Pub. Date: Feb. 24, 2011

(65) Prior Publication Data
US 2012/0136122 A1   May 31, 2012

(30) Foreign Application Priority Data
Aug. 21, 2009 (JP) ................................. 2009-192151

(51) Int. Cl.
*C08C 19/02* (2006.01)
(52) U.S. Cl.
USPC ....................................................... 525/355
(58) Field of Classification Search .................. 525/355
See application file for complete search history.

(56) References Cited

U.S. PATENT DOCUMENTS

| | | | | |
|---|---|---|---|---|
| 4,775,730 A | * | 10/1988 | Gupta | 526/326 |
| 4,857,601 A | * | 8/1989 | Gupta | 525/344 |
| 4,877,843 A | * | 10/1989 | Gupta | 525/344 |
| 4,898,916 A | * | 2/1990 | Gupta | 525/344 |
| 5,239,015 A | | 8/1993 | Sheehan et al. | |
| 5,274,175 A | * | 12/1993 | Shah et al. | 560/130 |
| 5,580,936 A | * | 12/1996 | Tsuchiya et al. | 525/340 |
| 6,051,659 A | * | 4/2000 | Merritt et al. | 525/354 |
| 6,743,861 B1 | | 6/2004 | Matsumoto et al. | |
| 6,875,821 B2 | * | 4/2005 | Muramoto et al. | 525/344 |

FOREIGN PATENT DOCUMENTS

| | | |
|---|---|---|
| JP | A-59-199705 | 11/1984 |
| JP | A-61-073725 | 4/1986 |
| JP | A-62-174222 | 7/1987 |
| JP | A-62-212417 | 9/1987 |
| JP | A-02-047109 | 2/1990 |
| JP | A-04-279608 | 10/1992 |
| JP | A-05-170920 | 7/1993 |
| JP | A-06-298862 | 10/1994 |
| JP | A-2000-026536 | 1/2000 |
| JP | B2-3471010 | 11/2003 |
| JP | A-2009-235132 | 10/2009 |
| WO | WO 92/21712 A1 | 12/1992 |
| WO | WO 01/18083 A1 | 3/2001 |
| WO | WO 01/18084 A1 | 3/2001 |

OTHER PUBLICATIONS

International Search Report issued in Application No. PCT/JP2010/005123; Dated Oct. 12, 2010 (With Translation).
Jan. 25, 2013 Supplementary European Search Report issued in European Application No. EP 10809738.7.

* cited by examiner

*Primary Examiner* — Robert S Loewe
(74) *Attorney, Agent, or Firm* — Oliff & Berridge, PLC

(57) ABSTRACT

A modified polysiloxane compound represented by formula (I): X(Y)n (I), where X represents a polymer block having a repeating unit represented by formula (II), Y represents a polymer block having a repeating unit represented by formula (III), and n represents 1 or 2, and having an X to Y weight ratio of $1/99 \leq X/Y \leq 90/10$ and a number-average molecular weight of 1,000 to 100,000 is subjected to treat for elimination of a protecting group for a hydroxyl group by adding a non-aqueous solution containing hydrogen chloride in the presence of a non-aqueous solvent so that hydrogen chloride is 0.9 to 1.3 equivalents with respect to 1 equivalent of the repeating unit represented by formula (II).

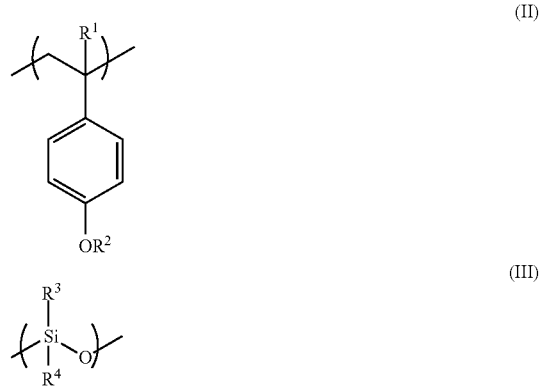

4 Claims, No Drawings

PROCESS FOR THE PRODUCTION OF MODIFIED POLYSILOXANES

TECHNICAL FIELD

The present invention relates to a method for the production of a modified polysiloxane compound, and particularly to a method for the production of a phenol structure-introduced, modified polysiloxane compound obtained by block copolymerization of a p-alkenylphenol unit and an organosiloxane unit as essential constituent units.

This application claims priority to Japanese Patent Application No. 2009-192151 filed on Aug. 21, 2009, the content of which is incorporated herein.

BACKGROUND ART

Organopolysiloxane compounds have excellent interface properties, such as thermal stability, water repellency, defoaming properties, and releasability, and thus are frequently used in various fields. Particularly, in recent years, because of the utilizing of their specific interface properties, uses as coating forming agents have expanded. In addition, the applications as modifiers for providing the temperature properties and interface properties of the organopolysiloxane compounds to various resins have also been actively developed.

In other words, for example, dimethylpolysiloxane, methylphenylpolysiloxane, fatty acid-modified polysiloxanes, and polyether-modified polysiloxanes have been conventionally used for the improvement of the performance of synthetic resins, such as paints and molded compounds. However, the range of use has been limited because these have insufficient compatibility with resins and insufficient heat resistance.

In order to solve these problems, various reactive polysiloxane compounds, for example, low-molecular-weight dimethylsiloxane compounds having a functional group, such as an epoxy group, an amino group, a hydroxyl group, or a (meth)acryl group, at molecular end group are commercially available. In addition, reaction products of these and other resins, for example, reaction products of terminal epoxy group-containing polysiloxanes and phenolic resins (Patent Document 1, Patent Document 2, and the like), and reaction products of terminal hydrogen group-containing polysiloxanes and alkenyl group-containing epoxy resins (Patent Document 3 and the like) are proposed.

In recent years, polysiloxane compounds having a controlled structure and having any number of functional groups in the molecule have been eagerly desired as resist materials having submicron resolution capability required for the production of VLSIs, as modifiers for the mechanical properties, moisture resistance, surface properties and the like of various thermosetting resins and thermoplastic resins, and as separation membranes and biocompatible polymer materials. But, in the above-described processes, a disadvantage of the processes using commercially available low-molecular-weight dimethylsiloxane compounds having a functional group in the molecule is insufficient compatibility with other resins. Thus, it results in a decrease in molding processability and mechanical strength. In addition, the processes using reaction products of polysiloxanes having a functional group at an end and other resins are that undesirable phenomena, such as abnormal thickening and gelation, are likely to occur during the modification reaction, and unreacted components remain, resulting in a decrease in compatibility, and so on.

Therefore, for the purpose of producing a phenol structure-introduced, modified polysiloxane compound having a controlled molecular weight and structure and having a narrow molecular weight distribution, the applicants have developed a method of polymerizing a compound in which the phenolic hydroxyl group of p-alkenylphenol is protected by a saturated aliphatic protecting group by an anionic polymerization technique, then adding a cyclic siloxane compound for copolymerization, and then eliminating the saturated aliphatic protecting group (Patent Document 4).

Prior Art Documents

Patent Documents

Patent Document 1: Japanese Unexamined Patent Application Publication No. 61-73725
Patent Document 2: Japanese Unexamined Patent Application Publication No. 62-174222
Patent Document 3: Japanese Unexamined Patent Application Publication No. 62-212417
Patent Document 4: Japanese Patent No. 3471010

SUMMARY OF THE INVENTION

Object to be Solved by the Invention

In the method in Patent Document 4, it is necessary to use an acidic substance to eliminate the saturated aliphatic protecting group. But, depending on the type of the used acid and the reaction conditions, there are concerns, such as molecular weight change, and coloration, due to degradation and/or condensation. Patent Document 4 describes a specific example in which the elimination of the protecting group is performed by blowing a hydrogen chloride gas, but the appropriate use conditions and the appropriate use amount of hydrogen chloride are unclear.

It is an object of the present invention to provide the use conditions and the use amount of hydrogen chloride in which no molecular weight change, coloration, or the like is caused by degradation and/or condensation.

Means to Solve the Object

The present inventors have studied diligently to achieve the above object, and, as a result, found that the object can be achieved by reacting hydrogen chloride with a substantially equivalent amount with respect to a saturated aliphatic protecting group in a non-aqueous system in order to eliminate the saturated aliphatic protecting group, and completed the present invention.

Specifically, the present invention relates to a method for producing a modified polysiloxane compound, preferably the modified polysiloxane compound has a molecular weight distribution of 1.05 to 1.5, represented by formula (IV):

$$X'(Y)n \quad\quad\quad (IV)$$

[wherein X' represents a polymer block having a repeating unit represented by formula (V):

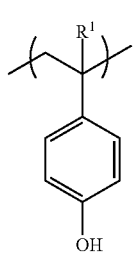

(wherein $R^1$ represents a hydrogen atom or a methyl group), Y represents a polymer block having a repeating unit represented by formula (III):

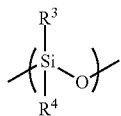

(III)

(wherein $R^3$ and $R^4$ each represent a linear or branched alkyl group having 1 to 20 carbon atoms, a cycloalkyl group, an aryl group, or an arylalkyl group, and $R^3$ and $R^4$ may be the same as or different from each other), and n represents 1 or 2], the method comprising subjecting a modified polysiloxane compound represented by formula (I):

X(Y)n       (I)

[wherein X represents a polymer block having a repeating unit represented by formula (II):

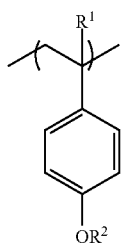

(II)

(wherein $R^1$ is defined as above, and $R^2$ represents linear or branched alkyl group having 1 to 6 carbon atoms), and Y and n are each defined as above], and having an X to Y weight ratio of $1/99 \leq X/Y \leq 90/10$ and a number-average molecular weight of 1,000 to 100,000, to treat for elimination of a protecting group for a hydroxyl group by adding a non-aqueous solution containing hydrogen chloride in the presence of a non-aqueous solvent and the amount of the hydrogen chloride is 0.9 to 1.3 equivalents with respect to 1 equivalent of the repeating unit represented by formula (II).

Further, the present invention relates to the method for producing a modified polysiloxane compound, wherein the modified polysiloxane compound represented by formula (I) is obtained by homopolymerizing a compound represented by formula (VII):

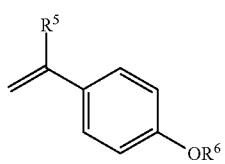

(VII)

(wherein $R^5$ represents a hydrogen atom or a methyl group, and $R^6$ represents a linear or branched alkyl group having 1 to 6 carbon atoms), or copolymerizing the compound represented by formula (VII) with a compound copolymerizable with the compound represented by formula (VII), in the presence of an anionic polymerization initiator, and then copolymerizing it by adding a cyclic siloxane compound for copolymerization.

MODE OF CARRYING OUT THE INVENTION (Modified Polysiloxane Compound)

A modified polysiloxane compound used in the present invention is represented by the following formula (I):

X(Y)n       (I)

[wherein X represents a polymer block having a repeating unit represented by formula (II):

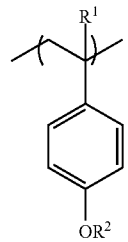

(II)

(wherein $R^1$ represents a hydrogen atom or a methyl group, and $R^2$ represents a linear or branched alkyl group having 1 to 6 carbon atoms), Y represents a polymer block having a repeating unit represented by formula (III):

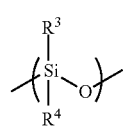

(III)

(wherein $R^3$ and $R^4$ each represent a linear or branched alkyl group having 1 to 20 carbon atoms, a cycloalkyl group, an aryl group, or an arylalkyl group, and $R^3$ and $R^4$ may be the same as or different from each other), and n represents 1 or 2].

The above modified polysiloxane compound has an X to Y weight ratio of $1/99 \leq X/Y \leq 90/10$ and a number-average molecular weight of 1,000 to 100,000.

X represents a polymer block having a repeating unit derived from one or two or more p-alkenylphenol derivatives, or a block consisting of a random copolymer or a block copolymer consisting of a repeating unit derived from a p-alkenylphenol derivative and a repeating unit of one or two or more conjugated diener and/or one or two or more vinyl compounds, and also includes one represented by the following formula (VI):

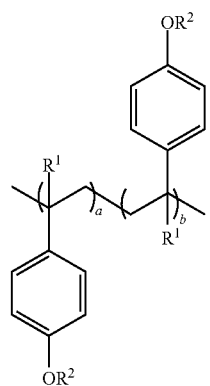

(VI)

(wherein $R^1$ and $R^2$ each represent the same meaning as the above, and a and b each represent any natural number according to the degree of polymerization).

Y in the above formula (I) of the present invention represents a polymer block having an organosiloxane represented by the above formula (III) as a repeating unit.

The compound represented by formula (I) is represented by X—Y or Y—X—Y.

(Process for Production of Modified Polysiloxane Compound)

The process for the production of the modified polysiloxane compound represented by X(Y)n according to the present invention is not particularly limited, and known processes can be employed. For example, the modified polysiloxane compound can be produced by the following process (see Japanese Patent No. 3471010).

A compound represented by formula (VII):

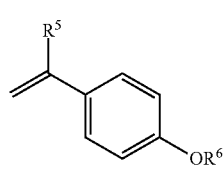

(VII)

(wherein $R^5$ represents a hydrogen atom or a methyl group, and $R^6$ represents a linear or branched alkyl group having 1 to 6 carbon atoms), is homopolymerized or copolymerized with a compound copolymerizable with the compound represented by formula (VII), in the presence of an anionic polymerization initiator, and then, a cyclic siloxane compound was added for copolymerization.

1. Process for Polymerization of X Moiety

A compound represented by formula (VII), or the compound represented by formula (VII) and a compound copolymerizable with it are anionically polymerized under vacuum or under an atmosphere of an inert gas such as nitrogen or argon, in an organic solvent, using an alkali metal and/or an organic alkali metal compound as a polymerization initiator, at a temperature of −100° C. to 150° C. A polymer having a controlled molecular weight and having a narrow molecular weight distribution can be obtained by the process.

Examples of the compound represented by the above formula (VII), used in the present invention, include p-n-butoxystyrene, p-sec-butoxystyrene, p-tert-butoxystyrene, and p-tert-butoxy-α-methylstyrene. Particularly, p-tert-butoxystyrene and p-tert-butoxy-α-methylstyrene are preferred.

The compound copolymerizable with the above formula (VII), used in the present invention, is preferably a conjugated diene or a vinyl compound. Examples of the conjugated diene or the vinyl compound include conjugated dienes, such as 1,3-butadiene, isoprene, 2,3-dimethyl-1,3-butadiene, 1,3-pentadiene, and 1,3-hexadiene; vinyl aromatic compounds, such as styrene, p-methylstyrene, α-methylstyrene, p-tert-butylstyrene, vinylnaphthalene, divinylbenzene, and 1,1-diphenylethylene; (meth)acrylates, such as methyl (meth)acrylate, ethyl (meth)acrylate, and butyl (meth)acrylate; vinylpyridines, such as 2-vinylpyridine and 4-vinylpyridine; and acrylonitrile. One of them or a mixture of two or more of them is used.

The alkali metal for the anionic polymerization initiator is lithium, sodium, potassium or the like. In addition, as the organic alkali metal compound, alkylates, allylates, and arylates of the above alkali metals and the like are used. Specific examples of the organic alkali metal compound include ethyllithium, n-butyllithium, sec-butyllithium, tert-butyllithium, ethylsodium, butadienyldilithium, butadienyldisodium, lithium biphenyl, lithium naphthalene, lithium fluorene, sodium biphenyl, sodium naphthalene, sodium triphenyl, and α-methylstyrenesodium dianion. One of these or a mixture of two or more of these is used.

As the organic solvent, one or a mixed solvent of two or more of organic solvents usually used in anionic polymerization, including aliphatic hydrocarbons, such as n-hexane and n-heptane; alicyclic hydrocarbons, such as cyclohexane and cyclopentane; aromatic hydrocarbons, such as benzene and toluene; and ethers, such as diethyl ether, dioxane and tetrahydrofuran is used.

For the form of the copolymer obtained by the above anionic polymerization, a random copolymer is obtained by adding a mixture of the compound represented by the above formula (IV) and the above monomer to the reaction system for polymerization, a partial block copolymer is obtained by previously polymerizing part of either one and then adding a mixture of both to continue the polymerization, and a complete block copolymer is synthesized by sequentially adding the compound represented by the above formula (IV) and the above monomer to the reaction system for polymerization.

2. Process for Production of Y Moiety

After the polymerization reaction of the above X moiety, a cyclic siloxane compound is added to the reaction system, and the anionic polymerization reaction is continued under conditions similar to those described above.

Finally, a block copolymer (hereinafter described as a precursor) consisting of a chain consisting of the compound represented by the above formula (VII) alone or the compound represented by the above formula (VII) and the compound copolymerizable with it, and a polysiloxane chain is produced.

The above cyclic siloxane compound used here is a compound represented by the following formula (VIII):

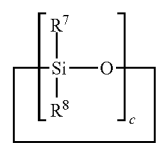

(VIII)

(wherein $R^7$ and $R^8$ each represent a linear or branched alkyl group having 1 to 20 carbon atoms, a cycloalkyl group, an aryl group, or an arylalkyl group, and c represents a positive integer of 3 to 7; and $R^7$ and $R^8$ may be the same as or different from each other).

Specific examples of the compound represented by the above formula (VIII) are, for example, hexamethylcyclotrisiloxane, octamethylcyclotetrasiloxane, decamethylcyclopentasiloxane, dodecamethylcyclohexasiloxane, hexaethylcyclotrisiloxane, octaethylcyclotetrasiloxane, and hexaphenylcyclotrisiloxane. One of these or a mixture of two or more of these can be used.

In these sequentially performed anionic polymerization reactions, polymerization conditions, such as the reaction temperature and the reaction solvent, can be appropriately changed within set ranges.

In addition, for the modified polysiloxane compound of the present invention, by processes other than the above-described process, for example, by, after the homopolymerization of the compound represented by the above (VII), or after the copolymerization reaction of the compound represented by the above (VII) with the compound copolymerizable with the compound represented by (VII), adding an organosiloxane compound having a functional group capable of reacting with the propagation end of the above polymer to the reaction system, and coupling reaction is occurred under conditions similar to those described above, a copolymer consisting of a chain of the compound represented by the above formula (VII) or a chain of the compound represented by the above formula (VII) and the compound copolymerizable with the compound represented by (VII), and a polysiloxane chain is produced.

The organosiloxane compound used here is not particularly limited in structure as long as it has a functional group capable of undergoing a coupling reaction with the propagation end of the above polymer. As specific examples, compounds represented by the following formulas (IX) and (X), and the like are used.

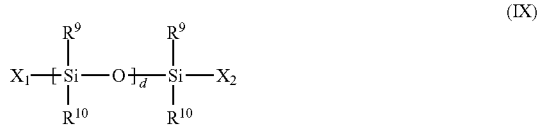

(IX)

(wherein $R^9$ and $R^{10}$ each represent a linear or branched alkyl group having 1 to 20 carbon atoms, a cycloalkyl group, an aryl group, or an aralkyl group, and $X_1$ and $X_2$ each represent a halogen atom, an epoxy group, a carbonyl group, a chlorocarbonyl group, or a hydrocarbon group having 1 to 20 carbon atoms, containing a halogen atom, an epoxy group, a carbonyl group, a chlorocarbonyl group, or the like, provided that d represents an integer of 1 or more.)

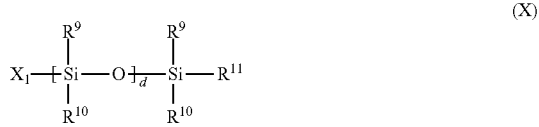

(X)

(wherein $R^9$, $R^{10}$, $X_1$, and d each represent the same meaning as the above, and $R^{11}$ represents a linear or branched alkyl group having 1 to 20 carbon atoms, a cycloalkyl group, an aryl group, or an aralkyl group).

Specific examples of the compounds represented by the above formulas (IX) and (X) include commercially available α,ω-bis(chloromethyl)polydimethylsiloxane, 1-(3-chloropropyl)-1,1,3,3,3-pentamethyldisiloxane, α,ω-bis(3-glycidoxypropyl)polydimethylsiloxane, and α,ω-dichloropolydimethylsiloxane.

In these step-wise performed polymerization reaction and coupling reaction, conditions, such as the reaction temperature and the reaction solvent, can be appropriately changed within set ranges.

(Elimination Treatment for Protecting Group for Hydroxyl Group)

A reaction for eliminating a protecting group for a hydroxyl group present in the repeating unit of formula (II) from the modified polysiloxane compound represented by the above formula (I) to produce a p-alkenylphenol structure can be performed by adding a non-aqueous solution containing hydrogen chloride, in the presence of a non-aqueous solvent, for example, solvents of aliphatic hydrocarbons, such as n-hexane and n-heptane; alicyclic hydrocarbons, such as cyclohexane and cyclopentane; aromatic hydrocarbons, such as benzene and toluene; ethers, such as diethyl ether, dioxane, and tetrahydrofuran; chlorine-based solvents, such as carbon tetrachloride; alcohols, such as methanol, ethanol, and 2-propanol; ketones, such as acetone, methyl ethyl ketone, and methyl isobutyl ketone; esters, such as ethyl acetate, butyl acetate, ethyl propionate, propylene glycol monomethyl ether acetate, and ethyl lactate; and organic acids, such as formic acid, acetic acid, propionic acid, and butyric acid, and a phenol structure-introduced, modified polysiloxane compound having a controlled molecular weight and structure and having a narrow molecular weight distribution is produced.

When the deprotection treatment of the modified polysiloxane compound represented by (I) is performed, the polymerization reaction crude liquid produced by the above process may be used as it is.

The non-aqueous solution containing hydrogen chloride can be made by blowing and dissolving a hydrogen chloride gas into a dehydrated solvent. Alternatively, a commercial product may be purchased. When hydrogen chloride is dissolved, its concentration can be defined by neutralization titration.

For the amount of hydrogen chloride used, the amount of hydrogen chloride is 0.9 to 1.3 equivalents, preferably 0.95 to 1.1 equivalents, with respect to 1 equivalent of the repeating unit represented by formula (II). The reaction temperature is 0 to 100° C., preferably room temperature to 70° C.

As the organic solvent for the reaction, the above single solvent of one or mixed solvent of two or more can be used, and ethers, such as tetrahydrofuran and dioxane are preferred.

In addition, as the solvent of the solution containing hydrogen chloride, a single solvent of one or a mixed solvent of two or more of aliphatic hydrocarbons, such as n-hexane and n-heptane; alicyclic hydrocarbons, such as cyclohexane and cyclopentane; aromatic hydrocarbons, such as benzene and toluene; ethers, such as diethyl ether, dioxane, and tetrahydrofuran; chlorine-based solvents, such as carbon tetrachloride; alcohols, such as methanol, ethanol, and 2-propanol; ketones, such as acetone, methyl ethyl ketone, and methyl isobutyl ketone; esters, such as ethyl acetate, butyl acetate, ethyl propionate, and propylene glycol monomethyl ether acetate; and organic acids, such as formic acid, acetic acid, propionic acid, and butyric acid can be used. Ethers, such as tetrahydrofuran and dioxane, are preferred.

The modified polysiloxane compound deprotected by the above production process has a number-average molecular weight of 2,000 to 20,000, further preferably 4,000 to 12,000, and a molecular weight distribution of 1.05 to 1.5, preferably 1.1 to 1.3.

In uses comprising a pattern formation process with an alkali developer (for example, photoresists), if the molecular weight is too small (molecular weight<4,000), the pattern is not sufficiently maintained. If the molecular weight is too large (molecular weight>20,000), the rate of dissolution in the alkali developer is slow, and the resolution is poor. Whereas when the modified polysiloxane compound has a number-average molecular weight of 10,000 or more, thixotropic properties are expressed when a solution is made with it, and therefore, such a modified polysiloxane compound is suitable for uses as paints and adhesives.

The composition of the deprotected modified polysiloxane compound is not limited unless the respective properties of p-hydroxystyrene and dimethylsiloxane are impaired. But, as a composition ratio in which the characteristic behaviors of the copolymer are expressed, considering the balance between the heat resistance, hydroxyl group amount as the crosslinking reaction site, alkali solubility, and the like of the p-hydroxystyrene moiety and the heat resistance, weather resistance, flame retardancy, dielectric properties, electrical insulation properties, water repellency, releasability, and the like of the dimethylsiloxane moiety, p-hydroxystyrene/dimethylsiloxane (the ratio of mole % of the units) is 10/90 to 90/10, preferably 30/70 to 70/30.

EXAMPLES

The present invention will be more specifically described by Examples and Comparative Examples. However, the scope of the present invention is not limited by the following Examples in any way.

In the following examples, "PTBST" means p-tert butoxy-styrene.

[Reference Example]
Preparation of Precursor Polymer (PTBST-Dimethylsiloxane)

707 g of PTBST was added to a mixed solution of 87 g of n-butyllithium (a hexane solution at a concentration of 15.36% by weight) in 1320 g of toluene, and 707 g of THF with stirring at −40° C. over 30 minutes, and the reaction was further continued for 30 minutes. Then, 1190 g of a THF solution comprising 0.22 moles of hexamethylcyclotrisiloxane was added to this reaction solution over 1 hour. The mixture was further stirred for 4 hours while the reaction temperature was kept at 40° C., and then, further stirred overnight at room temperature. Then, 25 g of trimethylsilyl chloride was added to the reaction solution to terminate the reaction to obtain a precursor polymer. The precursor polymer, PTBST-dimethylsiloxane, had a number-average molecular weight (Mn)=6200, a molecular weight distribution=1.14, and a composition ratio: PTBST/dimethylsiloxane=50/50, mole %. This polymerization crude liquid was water-washed, and the organic layer was concentrated. Then, a THF solution at a concentration of 35% by weight was prepared.

Example 1

8.1 g of a 4 M hydrogen chloride-dioxane solution was added to 20 g of the THF solution of the precursor polymer (PTBST-dimethylsiloxane) at a concentration of 35% by weight obtained in the Reference Example. The amount of hydrogen chloride added corresponds to 1.1 equivalents with respect to PTBST in the precursor polymer. This mixed solution was heated to 50° C., and sampled every hour. The progress of the reaction of debutylation was confirmed by IR spectrum measurement, and the reaction end point was determined by the disappearance of a peak at 899 cm$^{-1}$ derived from the C—H out-of-plane bending vibration of the PTBST aromatic ring.

As a result, the peak at 899 cm$^{-1}$ disappeared in 6 hours after the start of the reaction, and therefore, it was confirmed that the reaction was completed.

Comparative Example 1

An operation was performed as in Example 1 except that the amount of the 4 M hydrogen chloride-dioxane solution added was 3.8 g. This amount of hydrogen chloride added corresponds to 0.5 equivalents with respect to PTBST in the precursor polymer.

As a result, the peak at 899 cm$^{-1}$ derived from the C—H out-of-plane bending vibration of the PTBST aromatic ring did not disappear even in 48 hours after the start of the reaction, and therefore, it was confirmed that with 0.5 equivalents, the reaction was not completed.

Comparative Example 2

An operation was performed as in Example 1 except that the amount of the 4 M hydrogen chloride-dioxane solution added was 7.3 g for 10 g of the THF solution of the precursor polymer at a concentration of 35% by weight. This amount of hydrogen chloride added corresponds to 2 equivalents with respect to PTBST in the precursor polymer.

As a result, the peak at 899 cm$^{-1}$ derived from the C—H out-of-plane bending vibration of the PTBST aromatic ring disappeared in 2 hours after the start of the reaction, and therefore, it was confirmed that the debutylation reaction was completed. But, the shape of the GPC elution curve was degraded, and it became clear that the polymer decomposed.

Comparative Example 3

An operation was performed as in Example 1 except that the amount of sulfuric acid added was 6.0 g for 40 g of the THF solution of the precursor polymer at a concentration of 35% by weight. This amount of sulfuric acid added corresponds to 1.1 equivalents with respect to PTBST in the precursor polymer.

As a result, when sulfuric acid was used, the reaction solution immediately became brown after the start of the reaction. In addition, the peak at 899 cm$^{-1}$ derived from the C—H out-of-plane bending vibration of the PTBST aromatic ring disappeared in 1 hour, and therefore, it was confirmed that the debutylation reaction was completed. But, the shape of the GPC elution curve was degraded, and it became clear that the polymer decomposed.

Example 2

4.0 g of a 4 M hydrogen chloride-dioxane solution was added to 10 g of a dioxane solution of the precursor polymer (PTBST-dimethylsiloxane, number-average molecular weight (Mn)=6200, molecular weight distribution=1.14, composition ratio: PTBST/dimethylsiloxane=50/50 mole %) at a concentration of 35% by weight. The amount of hydrogen chloride added corresponds to 1.1 equivalents with respect to PTBST in the precursor polymer. This mixed liquid was reacted at room temperature, 40° C., 50° C., 60° C., and 70° C., and sampled every hour. The progress of the reaction of debutylation was confirmed by IR spectrum measurement, and the reaction end point was determined by the disappearance of a peak at 899 cm$^{-1}$ derived from the C—H out-of-plane bending vibration of the PTBST aromatic ring.

As a result, the peak at 899 cm$^{-1}$ disappeared in 48 hours at room temperature, in 6 hours at 40° C., in 3 hours at 50° C., in 2 hours at 60° C., and in 2 hours at 70° C. after the start of the reaction, and therefore, it was confirmed that the debutylation reaction was completed even if the solvent was replaced to the dioxane solution, and further the temperature was changed.

Comparative Example 4

An operation was performed as in Example 2 except that the amount of the 4 M hydrogen chloride-dioxane solution added was 7.3 g. This amount of hydrogen chloride added corresponds to 2 equivalents with respect to PTBST in the precursor polymer.

As a result, the peak at 899 cm$^{-1}$ derived from the C—H out-of-plane bending vibration of the PTBST aromatic ring disappeared after 24 hours at room temperature and in 1 hour at 50° C. after the start of the reaction, and therefore, it was confirmed that the debutylation reaction was completed. But, the shape of the GPC elution curve was degraded, and it became clear that the polymer decomposed.

Example 3

707 g of PTBST was added to a mixed solution of 87 g of n-butyllithium (a hexane solution at a concentration of 15.36% by weight) in 1320 g of toluene, and 707 g of THF with stirring at −40° C. over 30 minutes, and the reaction was further continued for 30 minutes. Then, 1190 g of a THF solution comprising 0.22 moles of hexamethylcyclotrisiloxane was added to this reaction solution over 1 hour. The mixture was further stirred for 4 hours while the reaction temperature was kept at 40° C., and then, further stirred overnight at room temperature. Then, 25 g of trimethylsilyl chloride was added to the reaction solution to terminate the reaction to obtain a precursor polymer. The precursor polymer, PTBST-dimethylsiloxane, had a number-average molecular weight (Mn)=6200, a molecular weight distribution=1.14, and a composition ratio: PTBST/dimethylsiloxane=50/50, mole %.

3.2 g of a 4 M hydrogen chloride-dioxane solution was added to 10 g of the polymerization reaction crude solution of this precursor polymer. The amount of hydrogen chloride added corresponds to 1.1 equivalents with respect to PTBST in the precursor polymer. This mixed solution was reacted at 50° C., and sampled every hour. The progress of the reaction of debutylation was confirmed by IR spectrum measurement, and the reaction end point was determined by the disappearance of a peak at 899 cm$^{-1}$ derived from the C—H out-of-plane bending vibration of the PTBST aromatic ring.

As a result, the peak at 899 cm$^{1}$ disappeared in 2 hours after the start of the reaction, and therefore, it was confirmed that the reaction was completed even if the polymerization reaction crude solution was used.

This p-hydroxystyrene-dimethylsiloxane copolymer obtained by debutylation was measured by GPC. The copolymer had a number-average molecular weight (Mn)=5800 and a molecular weight distribution=1.17, and a decrease in molecular weight corresponding to the elimination of the butyl group was confirmed. In addition, the shape of the GPC elution curve was substantially the same as before the reaction, and it was shown that the degradation of the polymer did not occur.

INDUSTRIAL APPLICABILITY

According to the method of the present invention, a phenol structure-introduced, modified polysiloxane compound having a controlled molecular weight and structure and having a narrow molecular weight distribution can be synthesized without molecular weight change, coloration, or the like being caused by degradation and/or condensation.

Therefore, the modified polysiloxane compound is expected to be used in wide fields as resist materials having submicron resolution capability required for the production of VLSIs, also as modifiers for various thermosetting resins and thermoplastic resins, and further as separation membranes and biocompatible materials.

The invention claimed is:
1. A method for producing a modified polysiloxane compound represented by formula (IV):

X'(Y)n     (IV)

[wherein X' represents a polymer block having a repeating unit represented by formula (V):

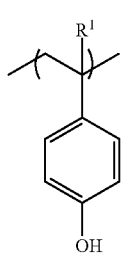

(V)

(wherein R$^1$ represents a hydrogen atom or a methyl group), Y represents a polymer block having a repeating unit represented by formula (III):

(III)

(wherein R$^3$ and R$^4$ each represent a linear or branched alkyl group having 1 to 20 carbon atoms, a cycloalkyl group, an aryl group, or an arylalkyl group, and R$^3$ and R$^4$ may be the same as or different from each other), and n represents 1 or 2], the method comprising subjecting a modified polysiloxane compound represented by formula (I):

X(Y)n     (I)

[wherein X represents a polymer block having a repeating unit represented by formula (II):

(II)

(wherein R$^1$ is defined as above, and R$^2$ represents a linear or branched alkyl group having 1 to 6 carbon atoms), and Y and n are each defined as above], and having an X to Y weight ratio of $1/99 \leqq X/Y \leqq 90/10$ and a number-average molecular weight of 1,000 to 100,000, to treat for elimination of a protecting group for a hydroxyl group by adding a non-aqueous solution containing hydrogen chloride in the presence of a non-aqueous solvent and the amount of the hydrogen chloride is 0.9 to 1.3 equivalents with respect to 1 equivalent of the repeating unit represented by formula (II).

2. The method for producing a modified polysiloxane compound according to claim 1, wherein the modified polysiloxane compound has a molecular weight distribution of 1.05 to 1.5.

3. The method for producing a modified polysiloxane compound according to claim 2, wherein the modified polysiloxane compound represented by formula (I) is obtained by homopolymerizing a compound represented by formula (VII):

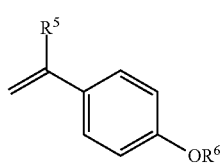

(VII)

(wherein R$^5$ represents a hydrogen atom or a methyl group, and R$^6$ represents a linear or branched alkyl group having 1 to 6 carbon atoms), or copolymerizing the compound represented by formula (VII) with a compound copolymerizable with the compound represented by formula (VII), in the presence of an anionic polymerization initiator, and then copolymerizing it by adding a cyclic siloxane compound.

4. The method for producing a modified polysiloxane compound according to claim 1, wherein the modified polysiloxane compound represented by formula (I) is obtained by homopolymerizing a compound represented by formula (VII):

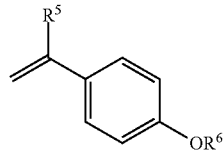

(VII)

(wherein $R^5$ represents a hydrogen atom or a methyl group, and $R^6$ represents a linear or branched alkyl group having 1 to 6 carbon atoms), or copolymerizing the compound represented by formula (VII) with a compound copolymerizable with the compound represented by formula (VII), in the presence of an anionic polymerization initiator, and then copolymerizing it by adding a cyclic siloxane compound.

* * * * *